United States Patent
Bellehumeur

(10) Patent No.: US 8,453,603 B2
(45) Date of Patent: *Jun. 4, 2013

(54) ANT REPELLANT STAND

(75) Inventor: Alexander R. Bellehumeur, Long Beach, CA (US)

(73) Assignee: Alexander R. Bellehumeur, Long Beach, CA (US)

( * ) Notice: Subject to any disclaimer, the term of this patent is extended or adjusted under 35 U.S.C. 154(b) by 212 days.

This patent is subject to a terminal disclaimer.

(21) Appl. No.: 12/971,499

(22) Filed: Dec. 17, 2010

(65) Prior Publication Data

US 2012/0152965 A1 Jun. 21, 2012

(51) Int. Cl.
*A01K 1/10* (2006.01)

(52) U.S. Cl.
USPC ............... 119/61.5; 43/133; 43/134; 43/121; 43/131; 119/61.53

(58) Field of Classification Search
USPC ............ 119/61.54, 51.5, 61; 43/109, 133, 43/134, 136, 121, 131; 248/346.11; 52/101
IPC ........................................................ A01K 5/01
See application file for complete search history.

(56) References Cited

U.S. PATENT DOCUMENTS

| | | | | |
|---|---|---|---|---|
| 1,305,553 A | * | 6/1919 | Kruse | 43/109 |
| 1,581,410 A | * | 4/1926 | Welsh | 43/109 |
| 2,356,022 A | * | 8/1944 | Wright | 43/120 |
| 4,953,506 A | | 9/1990 | Sanders | |
| 5,148,626 A | | 9/1992 | Haake, Sr. | |
| 5,176,465 A | * | 1/1993 | Holsted | 403/379.6 |
| 5,274,950 A | * | 1/1994 | Roberts | 43/121 |
| 5,285,749 A | * | 2/1994 | Byer | 119/61.53 |
| 5,619,952 A | | 4/1997 | Walker | |
| 5,996,531 A | | 12/1999 | Anderson | |
| 6,065,428 A | | 5/2000 | Fronk | |
| 6,510,648 B2 | * | 1/2003 | Roberts | 43/109 |
| 6,513,280 B2 | * | 2/2003 | Roberts | 43/109 |
| 6,735,901 B1 | * | 5/2004 | Bellehumeur | 43/132.1 |
| 7,341,019 B1 | * | 3/2008 | Tsengas | 119/61.5 |
| 2004/0244703 A1 | * | 12/2004 | Lehman | 119/61.53 |
| 2008/0011236 A1 | * | 1/2008 | Paez | 119/61.53 |
| 2010/0162961 A1 | * | 7/2010 | Hove et al. | 119/51.5 |
| 2010/0170447 A1 | * | 7/2010 | Pridgen, Jr. | 119/61.53 |

* cited by examiner

*Primary Examiner* — Mickey Yu
*Assistant Examiner* — Gideon Weinerth
(74) *Attorney, Agent, or Firm* — Fulwider Patton LLP

(57) ABSTRACT

An improved pet food bowl for resisting the infestation of crawling insects such as ants having a modular stand with a leg member supporting an inverted cup element, the two components being removable and replaceable, that cooperate to support a food bowl. The improved pet food bowl incorporates a repellant material and specially designed stem that prevents ants from ascending the stand to the bowl.

2 Claims, 3 Drawing Sheets

# ANT REPELLANT STAND

BACKGROUND OF THE INVENTION

The present invention relates generally to a stand or support device for deterring crawling insects such as ants from infesting another object, such as a pet food bowl, food storage reservoir, planter, or the like, and more particularly to a stand having a leg comprising a repellant to deter ants from ascending the legs.

Insect infestations are a common problem to many households and restaurants. Once insects such as ants infiltrate a space it can be most difficult to get rid of the ants once and for all, particularly where food is stored. For restaurants, food is typically stored in the same place making it easy for insects to return. In domestic locations, food is also normally stored in pantry that ants can enter and bring back food for its queen. Other sources of food include pet bowls that are placed on the ground, sometimes outside or in the kitchen area, which attracts ants and bring the ants to other sources of food. Plants, particularly those with sweet flowers, can attract ants that then spread to neighboring areas.

Numerous attempts have been made to help prevent ants from infesting food storage containers and, in particular, pet food dishes. One such approach is shown in the Anderson patent. U.S. Pat. No. 5,996,531. This device provides a container resting on a frame, which has support legs. Each of the support legs has a moat cup. A fluid is placed in the moat cup and provides a barrier to the passage of crawling insects. The filling of the moat cups would be a tedious step and in the event the frame is knocked over, the cups would become empty and require refilling.

Another approach is shown in U.S. Pat. No. 5,148,626 to Haake, Sr. This device is an insect barrier. It utilizes a spongy member disposed under a protective cover or under a peripheral ring surrounding a dish. This device requires a specially made dish to support a center post or the peripheral ring.

The Byer patent U.S. Pat. No. 5,285,749 shows a dish supported off a floor by a plurality of pillars. Each pillar has a down-sloping hemispherical shaped collar, which is said to prevent the passage of ants.

U.S. Pat. No. 4,953,506 to Sanders utilizes an annular moat containing a sticky substance for trapping insects. The Walker patent U.S. Pat. No. 5,619,952 shows an animal feeder, which utilizes a moat with a liquid or a cartridge or pad containing an insect repellent. Once again, a specially formed dish is required. The Frank patent U.S. Pat. No. 6,065,428 shows a pet dish with an insect barrier. The barrier is a recess near the bottom of the dish and includes a surrounding strip containing an insecticide. Once again, a specially formed dish is required.

The present inventor developed a unique solution to the shortcomings of the above-identified offerings, as described in U.S. Pat. No. 6,735,901, the contents of which are fully incorporated herein by reference. Entitled Ant Repellant Stand, the apparatus comprised a stand for affixing to and supporting a container or structure that enclosed substances that attract ants. The stand had an inverted cup with a base having an upwardly facing attachment surface that could be used to couple the stand to the associated container, and a downwardly depending peripheral side wall forming a cavity. A support post is affixed to the base and extends downwardly past the lower edge of the side wall. An ant repellant ring or treated fibrous material is supported within the cavity above the lower edge of the peripheral side wall. The ants climb up the support post, but are deterred by the repellant ring or fibrous material and thus they are repelled or exposed to the insecticide.

The present inventor has developed some additional improvements to the ant repellant stand that are incorporated into the present invention. The present invention is a pet food bowl stand, or mounting device, that can repel the insurgence of ants or crawling insects on low lying open containers, bowls, or trays. The stand or mounting device has an inverted cup structure and includes a peg that quickly snaps into the base of the bowl at a fitted hole, and the cup itself has a hole that receives the mating peg of a leg member. The inner surface of the cup, or the peg (or both), is coated with an ant repellant, forcing an insect to have to traverse the peg and cup across the repellant in order to climb up the bowl. The modular system with plug-in pegs allows for easy replacement and quick installation, so the stands can be exchanged when they lose their effectiveness if any, and further allows handling of the stands via the outer surface of the cup. The modular system allows the stand to be removed completely so that the container/bowl/tray can be cleaned such as in a dishwasher.

DETAILED DESCRIPTION OF THE PREFERRED EMBODIMENTS

For a better understanding of the present invention together with other and further objects, advantages and capabilities thereof, reference is made to the following disclosure and appended claims in connection with the above described drawings.

Figure 1:
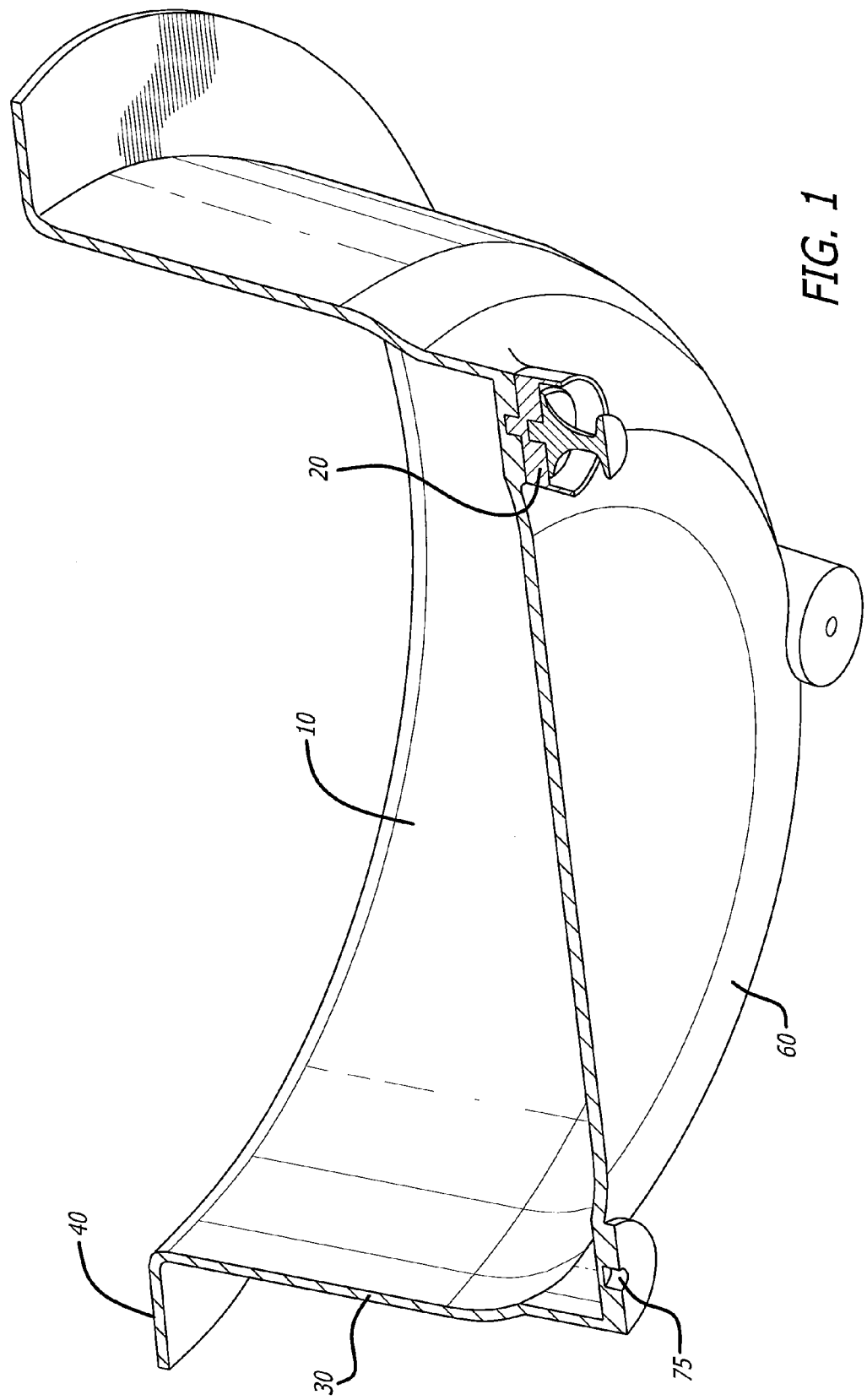
FIG. 1 is an elevated, perspective view, partially cut away, of a pet bowl of the present invention.
Figure 2:
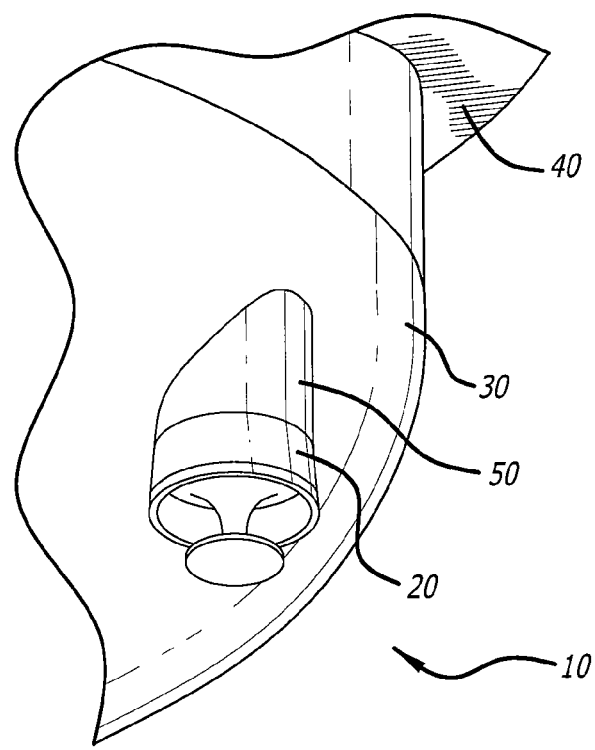
FIG. 2 is an enlarged, perspective view of the leg and cup assembly of FIG. 1.

A preferred embodiment of the present invention is an improved ant repellant bowl 10 and modular stand 20 as depicted in FIG. 1. The bowl 10 (of which only a half is shown half to better illustrate the features of the invention) has a cylindrical shell portion 30 forming the bowl's food enclosing area, and an upper lip 40 that forms the rim of the bowl. It is to be understood that the particular shape of the bowl does not play a role in the invention, as it could also take the form of a tray or other container. The base 60 of the bowl 10 is formed in a first embodiment with bosses 50 that may be cylindrical as shown projecting downward from the lower surface of the bowl 10. The bosses 50 preferably have a diameter that corresponds to a diameter of the modular stand 20 as shown in FIG. 2, and have a hole 75 adapted to receive a peg 85 from the stand 20 to couple the bowl 10 and stand 20. It is to be understood that the peg and hole could be reversed on the stand and the bowl and still fall within the scope of the invention.

Figure 3:
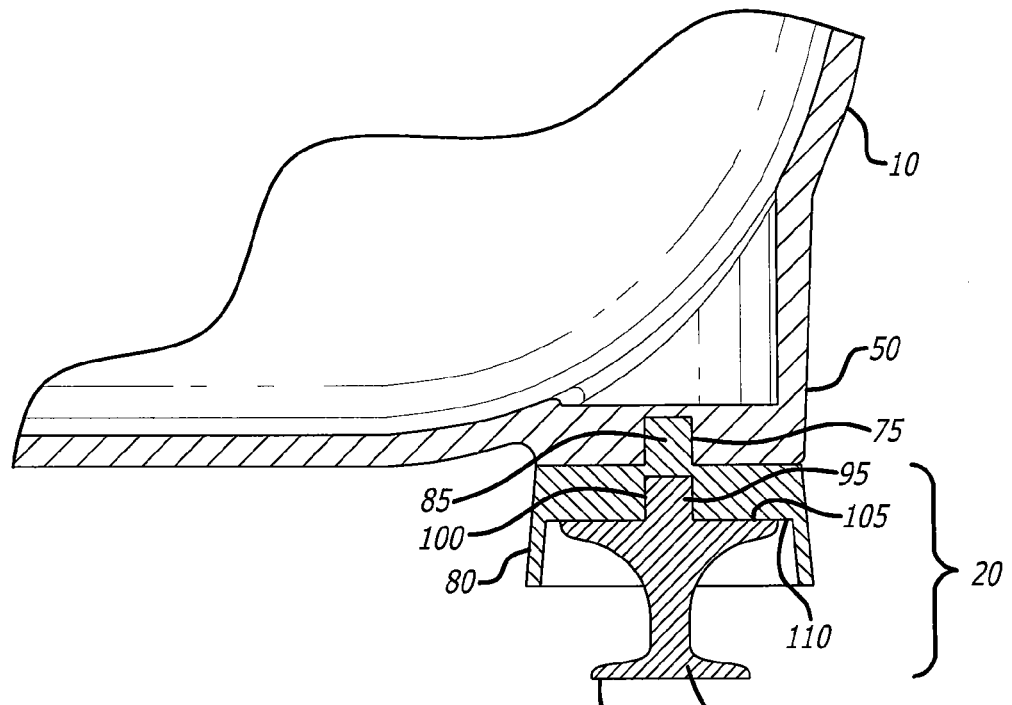
FIG. 3 is an enlarged, cross-sectional view of the leg and cup assembly of FIG. 1.
Figure 4:
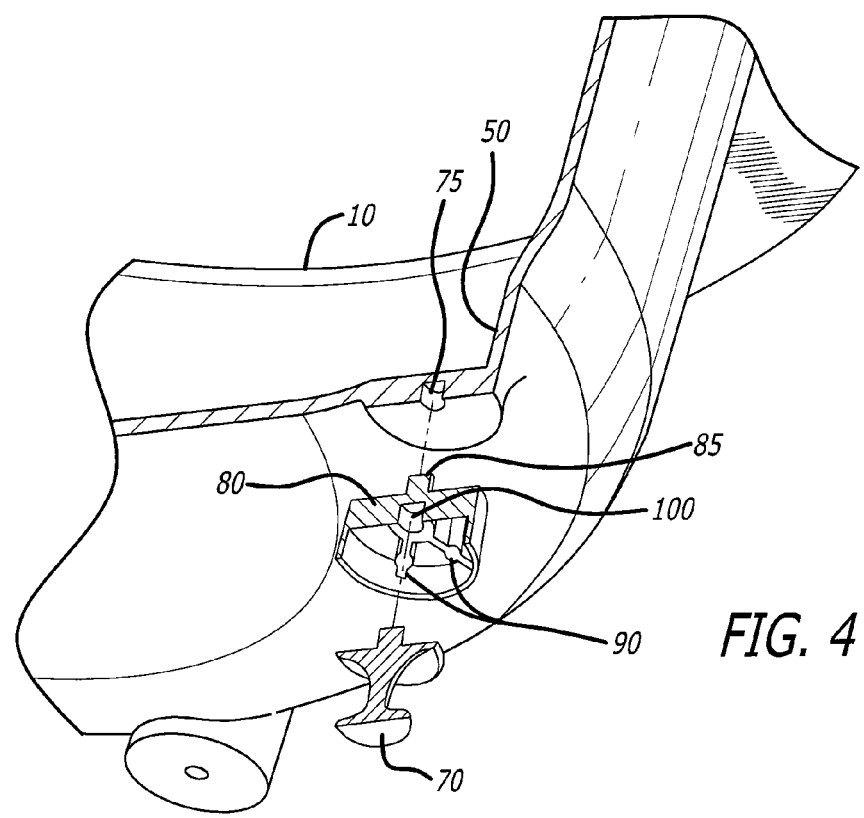
FIG. 4 is an enlarged, exploded view partially in cross-section of the leg and cup assembly of the bowl of FIG. 1.

The modular stand 20 is comprised of two interconnecting components, and leg component 70 and a cup component 80 as shown in FIG. 3. The cup component 80 is inverted and has an upwardly projecting peg 85 that mates with and snaps into the hole 75 on the downwardly projecting boss 50 of the bowl 10, providing a releasable connection between the stand and the bowl. The cup component 80 may have radially extending ribs 90 therein as best shown in FIG. 4 for structural purposes. The leg component 70 has a peg 95 that is received by a mating hole 100 on the cup component 80 that allows the leg 70 to releasably snap into the cup 80. This mating of the leg and cup allows for modularity of the components and permits quick and easy replacement of the cup components or the leg components. As with the stand and bowl, the cup component 80 and leg 70 could have the hole and peg switched without loss of functionality of the invention.

The leg component 70 may include an upper platform 105 that contacts and supports the lower surface 110 of the cup 80. The leg component 70 may then narrow along its length to a foot 120, providing less surface area for ants to ascend at this narrowing portion while providing a sufficient surface area to support the bowl. For larger food reservoirs, it is normally preferred to have at least three stands arranged in a triangular fashion, and more preferably four or more stands to prevent the food reservoir from tipping or rocking. The shape of the cup component 80 can help to protect and shield the leg component 70 against handling, rain, and so forth where the leg component 70 is coated with insect repellant.

Figure 5:
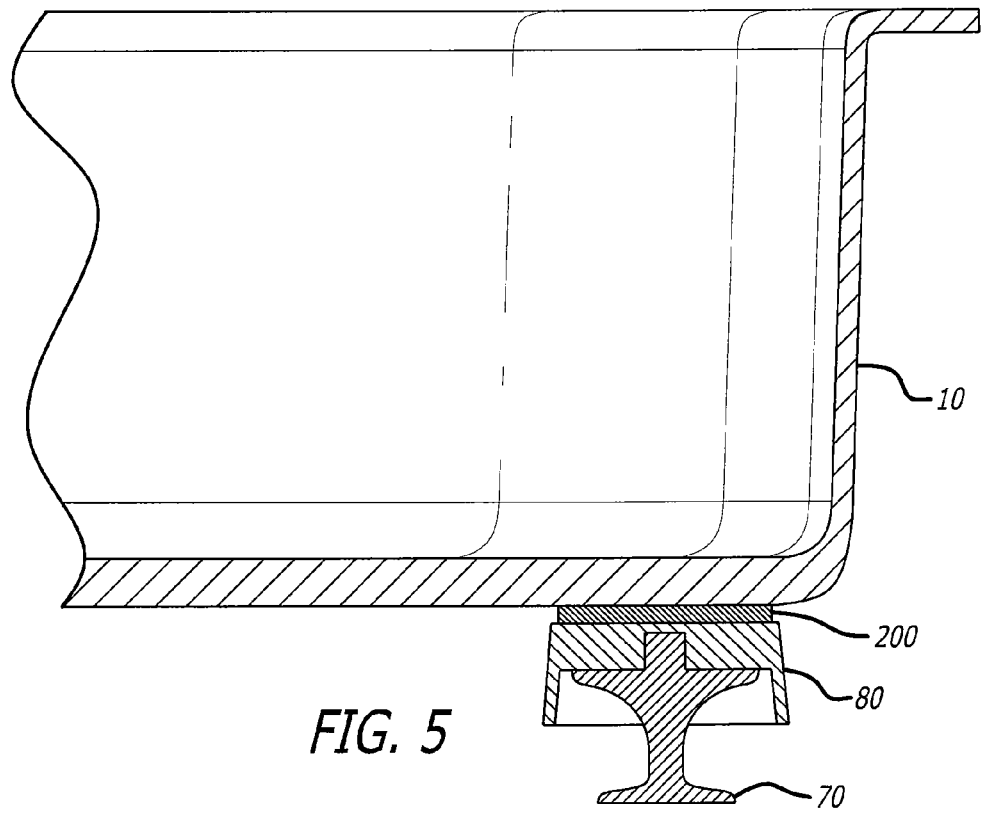
FIG. 5 is an enlarged, cross-sectional view of the leg and cup assembly with an adhesive member.

Another embodiment is shown in FIG. 5 showing a two-sided adhesive pad 200 adhered to the bowl 10 and the cup 80. The pad 200 serves as the mating component in place of the peg and hole arrangement in the previous embodiment. The pad 200 may be a two sided adhesive tape, adhesive pad, or other adhesive member that secures the stand 20 to the bowl 10.

When arranged as in the Figures, a pet food bowl 10 is completely off the ground and inaccessible to crawling ants or other insects except via the modular stand 20. To resist crawling insects such as ants from ascending the leg component 70 to the bowl, a coating of repellant is formed on the inner surface of the cup component 80 or the leg component 70. The repellant and the shape of the legs inhibit the ants, etc. from getting to the shell portion of the device. Various repellant materials may be used to coat the cup component 80 or the leg component 70 to prevent the ants from ascending to the bowl. If the repellant loses its effectiveness, the cup components 80 can be removed and replaced from the modular stand by removing the leg and then replacing the cup 80, and then reinserting the leg into the newly replaced cup component 80. The leg component 70 may also be replaced in this fashion for similar reasons. This is a significant improvement over previous stands and is more cost effective and prevents waste.

The invention thus offers a vastly improved resistance to ants and provides a device for overcoming the shortcomings in the art. Furthermore, although the illustrated application is shown supporting a pet food bowl, the present invention can be used with many other applications and should not be interpreted as being limited to any single application. That is, while the above description and drawings are intended to the illustrative of the present invention, nothing in the foregoing description should not be interpreted to be limiting. Rather, those of ordinary skill in the art will appreciate many alterations and substitutions to the embodiments described above, and the invention should be construed to include such alterations and substitutions. According, the invention's breadth should be measured by the words of the appended claims, read in light of the specification without importing unnecessary limitations therein.

I claim:

1. A container for deterring crawling insects from entering, the container comprising:
    a bowl shaped reservoir, including a plurality of holes formed in a bottom surface of the bowl shaped reservoir;
    a modular stand adapted to couple to the bowl shaped reservoir at a respective one of said holes, the modular stand comprising an inverted cup member having an interior surface and an exterior surface, the exterior surface having a peg insertable into said respective one of said holes, said inverted cup member releasably coupled to a leg member; and
    a coating applied to a surface of the leg member, the coating selected to deter ants from traversing from the leg member to the bowl shaped reservoir.

2. The container of claim 1 wherein the leg member has a base at a lower end, a narrowing along a middle portion, and a widening portion along an upper end.

\* \* \* \* \*